(12) United States Patent
Wang et al.

(10) Patent No.: US 9,736,878 B2
(45) Date of Patent: Aug. 15, 2017

(54) NFC RADIO FREQUENCY COMMUNICATION CONTROL METHOD, APPARATUS, AND SYSTEM

(71) Applicant: Huawei Device Co., Ltd., Shenzhen (CN)

(72) Inventors: Miao Wang, Shenzhen (CN); Xinmiao Chang, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 0 days.

(21) Appl. No.: 14/971,735

(22) Filed: Dec. 16, 2015

(65) Prior Publication Data

US 2016/0105925 A1    Apr. 14, 2016

Related U.S. Application Data

(63) Continuation of application No. PCT/CN2014/078597, filed on May 28, 2014.

(30) Foreign Application Priority Data

Jun. 17, 2013    (CN) .......................... 2013 1 0239303

(51) Int. Cl.

| | |
|---|---|
| *H04B 5/00* | (2006.01) |
| *H04W 76/02* | (2009.01) |
| *H04B 5/02* | (2006.01) |
| *H04W 4/00* | (2009.01) |
| *G06F 13/38* | (2006.01) |
| *G06F 21/35* | (2013.01) |
| *G06K 7/10* | (2006.01) |

(Continued)

(52) U.S. Cl.
CPC ........ *H04W 76/027* (2013.01); *G06F 13/385* (2013.01); *G06F 21/35* (2013.01);
(Continued)

(58) Field of Classification Search
CPC ... G06F 13/385; G06F 21/35; G06K 19/0723; G06K 7/10247; G06Q 20/3226;
(Continued)

(56) References Cited

U.S. PATENT DOCUMENTS

| | | |
|---|---|---|
| 2009/0247077 A1 | 10/2009 | Sklovsky et al. |
| 2010/0227553 A1 | 9/2010 | Charrat et al. |

(Continued)

FOREIGN PATENT DOCUMENTS

| | | |
|---|---|---|
| CN | 2574318 Y | 9/2003 |
| CN | 1825989 A | 8/2006 |

(Continued)

OTHER PUBLICATIONS

"NCI Requirements Specification", NFC Forum, Version 1.2 draft 4, Jan. 16, 2013, 29 pages.

*Primary Examiner* — Xin Jia

(57) ABSTRACT

An near field communication (NFC) radio frequency communication control method. The method includes: instructing, by a first NFC host by using a second message, an NFCC to terminate, according to the second message, a radio frequency communication process currently executed for a third NFC host after the first NFC receives a first message used to indicate that a second NFC host requests radio frequency communication and when the first NFC determines that the NFCC is currently in a non-idle state and a priority of the second NFC host is higher than a priority of the third NFC host, where the third NFC host is an NFC host corresponding to the radio frequency communication process currently executed by the NFCC. This effectively avoids the problem that a conflict occurs when multiple NFC hosts request radio frequency communication from an NFCC in an NFC multi-host architecture, thereby maintaining system running reliability.

21 Claims, 7 Drawing Sheets

(51) Int. Cl.
*G06K 19/07* (2006.01)
*H04B 5/06* (2006.01)
*H04W 12/06* (2009.01)
*H04W 12/08* (2009.01)
*H04W 8/00* (2009.01)

(52) U.S. Cl.
CPC ..... *G06K 7/10247* (2013.01); *G06K 19/0723* (2013.01); *H04B 5/0031* (2013.01); *H04B 5/0062* (2013.01); *H04B 5/02* (2013.01); *H04B 5/06* (2013.01); *H04W 4/008* (2013.01); *H04W 12/06* (2013.01); *H04W 12/08* (2013.01); *H04W 8/005* (2013.01)

(58) Field of Classification Search
CPC .............. G06Q 20/3278; H04B 5/0031; H04B 5/0062; H04B 5/02; H04B 5/06; H04W 12/06; H04W 12/08
USPC ................................................ 455/41.1, 41.2
See application file for complete search history.

(56) References Cited

U.S. PATENT DOCUMENTS

| | | |
|---|---|---|
| 2012/0032789 A1 | 2/2012 | Ichimaru et al. |
| 2012/0129450 A1 | 5/2012 | Lee |
| 2013/0005262 A1 | 1/2013 | Sakata |
| 2013/0078920 A1 | 3/2013 | Hillan |
| 2014/0273839 A1 | 9/2014 | Naniyat et al. |
| 2014/0302793 A1 | 10/2014 | Ma et al. |
| 2015/0011162 A1 | 1/2015 | Awad et al. |
| 2015/0271716 A1 | 9/2015 | Son et al. |

FOREIGN PATENT DOCUMENTS

| | | |
|---|---|---|
| CN | 101305585 A | 11/2008 |
| CN | 102047223 A | 5/2011 |
| CN | 102100121 A | 6/2011 |
| CN | 102388596 A | 3/2012 |
| CN | 102404702 A | 4/2012 |
| CN | 102714829 A | 10/2012 |
| CN | 102857266 A | 1/2013 |
| CN | 103326749 A | 9/2013 |
| CN | 103765791 A | 4/2014 |
| EP | 2 458 834 A1 | 5/2012 |
| EP | 2693368 A1 | 2/2014 |
| JP | 2008522466 A | 6/2008 |
| JP | 2005-045530 A | 2/2010 |
| JP | 2010045530 A | 2/2010 |
| JP | 2010061540 A | 3/2010 |
| JP | 2012-039257 | 2/2012 |
| WO | 2006056220 A1 | 6/2006 |
| WO | 2010/115889 A1 | 10/2010 |
| WO | 2012/132446 A1 | 10/2012 |
| WO | 2012/178107 A1 | 12/2012 |

NFC RADIO FREQUENCY COMMUNICATION CONTROL METHOD, APPARATUS, AND SYSTEM

CROSS-REFERENCE TO RELATED APPLICATIONS

This application is a continuation of International Application No. PCT/CN2014/078597, filed on May 28, 2014, which claims priority to Chinese Patent Application No. 201310239303.4, filed on Jun. 17, 2013, both of which are hereby incorporated by reference in their entireties.

TECHNICAL FIELD

Embodiments of the present invention relate to the field of NFC radio frequency communications, and in particular, to an NFC radio frequency communication control method, apparatus, and system.

BACKGROUND

Near field communication (NFC) is a short range wireless connection technology, and implements, based on a radio frequency identification (RFID) technology, short range communication between electronic devices by means of magnetic induction. To implement intuitive, secure, and non-contact information exchange, content exchange, and transactions, a user only needs to perform a touch operation or get devices closer. With gradual popularity of the NFC technology, many electronic products such as printers, televisions, sound boxes, mobile phones, and cameras are already integrated with an NFC function.

To implement the NFC function, an NFC device mainly includes three functional entities: a device host (DH), an NFC controller (NFCC), and a security element (SE). The DH is responsible for management of the NFCC, for example, initialization, configuration, and power management; the NFCC is responsible for physically transmitting data through a radio frequency interface and by using an antenna; and the SE provides a secure execution environment for an NFC application program. For example, for a smartphone, the DH corresponds to a CPU (such as an application processor or a baseband processor) of the mobile phone, the NFCC corresponds to an NFC chip of the mobile phone, and the SE may be a SIM card or an SD card.

An NFC control interface (NCI) defines a logical interface for communication between the DH and the NFCC. The DH sends a control instruction to the NFCC through the NCI to control the NFCC, and the NFCC may also send a response message or a notification message to the DH through the NCI. In addition, the DH may also send application data to the NFCC through the NCI, and the NFCC forwards the application data to a remote NFC device. Similarly, the NFCC may also send, to the DH through the NCI, data sent by the remote NFC device. Moreover, the NFCC and the SE may communicate with each other through a host controller interface (HCI) by using a communications protocol such as the Single Wire Protocol (SWP). The SE sends an instruction to the NFCC to control the NFCC.

In the NCI, two architectures are defined: a single host architecture and a multi-host architecture. Referring to FIG. 1, the single host architecture is an architecture in which one NFCC is only connected to a DH, and is not connected to an SE; and the multi-host architecture is an architecture in which one NFCC is connected to a DH and one or more SEs.

In the multi-host architecture, an NFCC may be connected to multiple SEs. For example, for a smartphone, multiple SEs may be SIM cards and SD cards, and for a dual card/mode mobile phone, each SIM card and each SD card both can correspond to one SE. Different application programs may run in different SEs. For example, for mobile payment, a payment application of a bank A may run in a SIM card of a first operator, a payment application of a bank B may run in a SIM card of a second operator, and a payment application of China UnionPay may run in an SD card. All these applications in the SE can communicate with a POS machine by using the NFCC to complete a payment transaction.

In the single host architecture, a host of an NFCC is a DH, while in the multi-host architecture, an NFCC is a shared resource, a DH and an SE that is connected to the NFCC are both hosts of the NFCC, and both can initiate a radio frequency communication request to the NFCC.

Currently, all NFC devices use the single host architecture or the multi-host architecture, but the SE does not serve as a host to control the NFCC. Therefore, in the multi-host architecture, although the DH and the SE both can request radio frequency communication from the NFCC, an NCI Specification does not provide any solution to a problem that a conflict occurs when multiple SEs simultaneously request radio frequency communication from the NFCC.

SUMMARY

Embodiments of the present invention provide an NFC radio frequency communication control method, apparatus, and system, which are used to resolve a problem that a conflict occurs when multiple NFC hosts simultaneously request radio frequency communication from an NFCC in a multi-host architecture.

Specific technical solutions provided by the embodiments of the present invention are as follows:

According to a first aspect, an NFC radio frequency communication control method includes:

receiving, by a first NFC host, a first message, where the first message is used to indicate that a second NFC host requests radio frequency communication;

when the first NFC host determines that an NFCC is currently in a non-idle state, comparing, by the first NFC host, a priority of the second NFC host with a priority of a third NFC host, where the third NFC host is an NFC host corresponding to a radio frequency communication process currently executed by the NFCC; and when the priority of the second NFC host is higher than the priority of the third NFC host, sending, by the first NFC host, a second message to the NFCC, to instruct the NFCC to terminate the radio frequency communication process currently executed for the third NFC host.

With reference to the first aspect, in a first possible implementation manner, the second message carries configuration information of the second NFC host, and the second message is further used to instruct the NFCC to execute a radio frequency communication process for the second NFC host; or when the priority of the second NFC host is higher than the priority of the third NFC host, the method further includes: sending, by the first NFC host, a third message to the second NFC host, to instruct the second NFC host to request radio frequency communication again.

With reference to the first aspect or the first possible implementation manner of the first aspect, in a second possible implementation manner, the receiving, by a first NFC host, a first message includes:

receiving, by the first NFC host, a notification message sent by the NFCC, where the notification message is sent by the NFCC after receiving a radio frequency communication request sent by the second NFC host; or receiving, by the first NFC host, a radio frequency communication request sent by the second NFC host.

With reference to the second possible implementation manner of the first aspect, in a third possible implementation manner, the determining, by the first NFC host, that an NFCC is currently in a non-idle state includes:

if the first NFC host receives the notification message sent by the NFCC, immediately determining, by the first NFC host when receiving the notification message, that the NFCC is currently in a non-idle state; or if the first NFC host receives the notification message sent by the NFCC, determining, by the first NFC host, that the NFCC is currently in a non-idle state after the first NFC host receives the notification message and when the first NFC host learns that the NFCC currently executes the radio frequency communication process for the third NFC host; or if the first NFC host receives the radio frequency communication request sent by the second NFC host, determining, by the first NFC host, that the NFCC is currently in a non-idle state after the first NFC host receives the radio frequency communication request and when the first NFC host learns that the NFCC currently executes the radio frequency communication process for the third NFC host.

With reference to the third possible implementation manner of the first aspect, in a fourth possible implementation manner, the method further includes:

after the first NFC host receives the notification message sent by the NFCC or receives the radio frequency communication request sent by the second NFC host, if the first NFC host learns that the NFCC is currently in an idle state, sending, by the first NFC host, a fourth message to the NFCC, to instruct the NFCC to execute the radio frequency communication process for the second NFC host.

With reference to the first aspect, and any one of the foregoing implementation manners of the first aspect, in a fifth possible implementation manner, the comparing, by the first NFC host, a priority of the second NFC host with a priority of a third NFC host includes:

comparing, by the first NFC host, the priority of the second NFC host with the priority of the third NFC host according to priority information pre-configured by the first NFC host for the second NFC host and the third NFC host; or comparing, by the first NFC host, the priority of the second NFC host with the priority of the third NFC host according to priority information initially configured in a system; or notifying, by the first NFC host, a user of prompt information of the second NFC host and that of the third NFC host, and comparing the priority of the second NFC host with the priority of the third NFC host according to priorities that are set by the user based on the prompt information.

With reference to the first aspect, and any one of the foregoing implementation manners of the first aspect, in a sixth possible implementation manner, the method further includes:

when the priority of the second NFC host is lower than the priority of the third NFC host, sending, by the first NFC host, a fifth message to the second NFC host, where the fifth message is used to indicate that the radio frequency communication requested by the second NFC host is rejected.

According to a second aspect, an NFC radio frequency communication control method includes:

sending, by an NFCC, a first message to a first NFC host when the NFCC receives a radio frequency communication request sent by a second NFC host; and terminating, by the NFCC, a radio frequency communication process currently executed for a third NFC host when the NFCC receives a second message sent by the first NFC host, where the second message is sent by the first NFC host when determining, after receiving the first message, that the NFCC is currently in a non-idle state and a priority of the second NFC host is higher than a priority of the third NFC host, and the third NFC host is an NFC host corresponding to the radio frequency communication process currently executed by the NFCC.

With reference to the second aspect, in a first possible implementation manner, the method further includes: further executing, by the NFCC, a radio frequency communication process for the second NFC host after the NFCC receives the second message, where the second message carries configuration information of the second NFC host; or executing, by the NFCC, a radio frequency communication process for the second NFC host after the NFCC receives the second message and when the NFCC receives a radio frequency communication request resent by the second NFC host, where after receiving a third message sent by the first NFC host, the second NFC host resends the radio frequency communication request.

With reference to the second aspect or the first possible implementation manner of the second aspect, in a second possible implementation manner, the sending, by an NFCC, a first message to a first NFC host when the NFCC receives a radio frequency communication request sent by a second NFC host includes:

sending, by the NFCC, a notification message to the first NFC host after the NFCC receives the radio frequency communication request sent by the second NFC host and when the NFCC determines that the NFCC currently executes the radio frequency communication process for the third NFC host; or sending, by the NFCC, a notification message to the first NFC host after the NFCC receives the radio frequency communication request sent by the second NFC host.

With reference to the second possible implementation manner of the second aspect, in a third possible implementation manner, the method further includes:

after the NFCC receives the radio frequency communication request sent by the second NFC host, if it is determined that the NFCC is currently in an idle state, executing, by the NFCC, the radio frequency communication process for the second NFC host.

With reference to the second possible implementation manner of the second aspect, in a fourth possible implementation manner, the method further includes:

if the NFCC sends the notification message to the first NFC host after the NFCC receives the radio frequency communication request sent by the second NFC host, executing, by the NFCC, the radio frequency communication process for the second NFC host after the NFCC receives a fourth message sent by the first NFC host, where the fourth message is sent by the first NFC host when determining that the NFCC is currently in an idle state.

With reference to the third aspect, and any one of the foregoing implementation manners of the third aspect, in a fifth possible implementation manner, the method further includes:

if the NFCC receives a fifth message sent by the first NFC host, rejecting, by the NFCC, the execution of the radio frequency communication process for the second NFC host, where the fifth message is sent by the first NFC host when determining that the NFCC is currently in a non-idle state and the priority of the second NFC host is lower than the priority of the third NFC host.

According to a third aspect, an NFC radio frequency communication control apparatus includes:

a receiving unit, configured to receive a first message, where the first message is used to indicate that a second NFC host requests radio frequency communication;

a main control unit, configured to: when determining that a near field communication controller NFCC is currently in a non-idle state, compare a priority of the second NFC host with a priority of a third NFC host, where the third NFC host is an NFC host corresponding to a radio frequency communication process currently executed by the NFCC; and a sending unit, configured to: when the priority of the second NFC host is higher than the priority of the third NFC host, send a second message to the NFCC, to instruct the NFCC to terminate the radio frequency communication process currently executed for the third NFC host.

With reference to the third aspect, in a first possible implementation manner, the second message carries configuration information of the second NFC host, and the second message is further used to instruct the NFCC to execute a radio frequency communication process for the second NFC host; or when the priority of the second NFC host is higher than the priority of the third NFC host, the sending unit is further configured to: send a third message to the second NFC host, to instruct the second NFC host to request radio frequency communication again.

With reference to the third aspect or the first possible implementation manner of the third aspect, in a second possible implementation manner, the receiving, by the receiving unit, a first message includes:

receiving, by the receiving unit, a notification message sent by the NFCC, where the notification message is sent by the NFCC after receiving a radio frequency communication request sent by the second NFC host; or receiving, by the receiving unit, a radio frequency communication request sent by the second NFC host.

With reference to the second possible implementation manner of the third aspect, in a third possible implementation manner, the determining, by the main control unit, that an NFCC is currently in a non-idle state includes:

if the receiving unit receives the notification message sent by the NFCC, immediately determining, when the receiving unit receives the notification message, that the NFCC is currently in a non-idle state; or if the receiving unit receives the notification message sent by the NFCC, determining, by the main control unit, that the NFCC is currently in a non-idle state after the receiving unit receives the notification message and when the main control unit learns that the NFCC currently executes the radio frequency communication process for the third NFC host; or if the receiving unit receives the radio frequency communication request sent by the second NFC host, determining, by the main control unit, that the NFCC is currently in a non-idle state after the receiving unit receives the radio frequency communication request and when the main control unit learns that the NFCC currently executes the radio frequency communication process for the third NFC host.

With reference to the third possible implementation manner of the third aspect, in a fourth possible implementation manner, the sending unit is further configured to:

after the receiving unit receives the notification message sent by the NFCC or receives the radio frequency communication request sent by the second NFC host, if the main control unit learns that the NFCC is currently in an idle state, send a fourth message to the NFCC, to instruct the NFCC to execute the radio frequency communication process for the second NFC host.

With reference to the third aspect, and any one of the foregoing possible implementation manners of the third aspect, in a fifth possible implementation manner, the comparing, by the main control unit, a priority of the second NFC host with a priority of a third NFC host includes:

comparing, by the main control unit, the priority of the second NFC host with the priority of the third NFC host according to priority information pre-configured by the first NFC host for the second NFC host and the third NFC host; or comparing, by the main control unit, compare the priority of the second NFC host with the priority of the third NFC host according to priority information initially configured in a system; or notifying, by the main control unit, a user of prompt information of the second NFC host and that of the third NFC host, and comparing the priority of the second NFC host with the priority of the third NFC host according to priorities that are set by the user based on the prompt information.

With reference to the third aspect, and any one of the foregoing possible implementation manners of the third aspect, in a sixth possible implementation manner, the sending unit is further configured to:

when the priority of the second NFC host is lower than the priority of the third NFC host, send a fifth message to the second NFC host, where the fifth message is used to indicate that the radio frequency communication requested by the second NFC host is rejected.

According to a fourth aspect, an NFC radio frequency communication control apparatus includes:

a communications unit, configured to: when receiving a radio frequency communication request sent by a second NFC host, send a first message to a first NFC host; and a processing unit, configured to: when the communications unit receives a second message sent by the first NFC host, terminate a radio frequency communication process currently executed for a third NFC host, where the second message is sent by the first NFC host when determining, after receiving the first message, that the NFCC is currently in a non-idle state and a priority of the second NFC host is higher than a priority of the third NFC host, and the third NFC host is an NFC host corresponding to the radio frequency communication process currently executed by the NFCC.

With reference to the fourth aspect, in a first possible implementation manner, the second message carries configuration information of the second NFC host, and after the communications unit receives the second message, the processing unit further executes a radio frequency communication process for the second NFC host; or after the communications unit receives the second message and when the communications unit receives a radio frequency communication request resent by the second NFC host, the processing unit executes a radio frequency communication process for the second NFC host, where after receiving a third message sent by the first NFC host, the second NFC host resends the radio frequency communication request.

With reference to the fourth aspect or the first possible implementation manner of the fourth aspect, in a second possible implementation manner, the sending, by the communications unit, a first message to a first NFC host when the communications unit receives a radio frequency communication request sent by a second NFC host includes:

sending, by the communications unit, a notification message to the first NFC host after the communications unit receives the radio frequency communication request sent by the second NFC host and when it is determined that the processing unit currently executes the radio frequency communication process for the third NFC host; or sending, by the communications unit, a notification message to the first NFC host after the communications unit receives the radio frequency communication request sent by the second NFC host.

With reference to the second possible implementation manner of the fourth aspect, in a third possible implementation manner, the processing unit is further configured to:

after the communications unit receives the radio frequency communication request sent by the second NFC host, if the processing unit determines that the processing unit is currently in an idle state, execute the radio frequency communication process for the second NFC host.

With reference to the second possible implementation manner of the fourth aspect, in a fourth possible implementation manner, the processing unit is further configured to:

if the communications unit sends the notification message to the first NFC host after the communications unit receives the radio frequency communication request sent by the second NFC host, after the communications unit receives a fourth message sent by the first NFC host, execute the radio frequency communication process for the second NFC host, where the fourth message is sent by the first NFC host when determining that the NFCC is currently in an idle state.

With reference to the fourth aspect, and any one of the foregoing implementation manners of the fourth aspect, in a fifth possible implementation manner, the processing unit is further configured to:

if the communications unit receives a fifth message sent by the first NFC host, reject the execution of the radio frequency communication process for the second NFC host, where the fifth message is sent by the first NFC host when determining that the NFCC is currently in a non-idle state and the priority of the second NFC host is lower than the priority of the third NFC host.

According to a fifth aspect, an NFC radio frequency communication control apparatus includes:

a receiving port, configured to receive a first message, where the first message is used to indicate that a second NFC host requests radio frequency communication;

a processor, configured to: when determining that a near field communication controller NFCC is currently in a non-idle state, compare a priority of the second NFC host with a priority of a third NFC host, where the third NFC host is an NFC host corresponding to a radio frequency communication process currently executed by the NFCC; and a sending port, configured to: when the priority of the second NFC host is higher than the priority of the third NFC host, send a second message to the NFCC, to instruct the NFCC to terminate the radio frequency communication process currently executed for the third NFC host.

With reference to the fifth aspect, in a first possible implementation manner, the second message carries configuration information of the second NFC host, and the second message is further used to instruct the NFCC to execute a radio frequency communication process for the second NFC host; or when the priority of the second NFC host is higher than the priority of the third NFC host, the sending port is further configured to: send a third message to the second NFC host, to instruct the second NFC host to request radio frequency communication again.

With reference to the fifth aspect or the first possible implementation manner of the fifth aspect, in a second possible implementation manner, the receiving, by the receiving port, a first message includes:

receiving, by the receiving port, a notification message sent by the NFCC, where the notification message is sent by the NFCC after receiving a radio frequency communication request sent by the second NFC host; or receiving, by the receiving port, a radio frequency communication request sent by the second NFC host.

With reference to the second possible implementation manner of the fifth aspect, in a third possible implementation manner, the determining, by the processor, that an NFCC is currently in a non-idle state includes:

if the receiving port receives the notification message sent by the NFCC, immediately determining, when the receiving port receives the notification message, that the NFCC is currently in a non-idle state; or if the receiving port receives the notification message sent by the NFCC, after the receiving port receives the notification message and when the processor learns that the NFCC currently executes the radio frequency communication process for the third NFC host, determining, by the processor, that the NFCC is currently in a non-idle state; or if the receiving port receives the radio frequency communication request sent by the second NFC host, after the receiving port receives the radio frequency communication request and when the processor learns that the NFCC currently executes the radio frequency communication process for the third NFC host, determining, by the processor, that the NFCC is currently in a non-idle state.

With reference to the third possible implementation manner of the fifth aspect, in a fourth possible implementation manner, the sending port is further configured to:

after the receiving port receives the notification message sent by the NFCC or receives the radio frequency communication request sent by the second NFC host, if the processor learns that the NFCC is currently in an idle state, send a fourth message to the NFCC, to instruct the NFCC to execute the radio frequency communication process for the second NFC host.

With reference to the fifth aspect, and any one of the foregoing possible implementation manners of the fifth aspect, in a fifth possible implementation manner, the comparing, by the processor, a priority of the second NFC host with a priority of a third NFC host includes:

comparing, by the processor, the priority of the second NFC host with the priority of the third NFC host according to priority information pre-configured by the first NFC host for the second NFC host and the third NFC host; or comparing, by the processor, the priority of the second NFC host with the priority of the third NFC host according to priority information initially configured in a system; or notifying, by the processor, a user of prompt information of the second NFC host and that of the third NFC host, and comparing the priority of the second NFC host with the priority of the third NFC host according to priorities that are set by the user based on the prompt information.

With reference to the fifth aspect, and any one of the foregoing possible implementation manners of the fifth aspect, in a sixth possible implementation manner, the sending port is further configured to:

when the priority of the second NFC host is lower than the priority of the third NFC host, send a fifth message to the second NFC host, where the fifth message is used to indicate that the radio frequency communication requested by the second NFC host is rejected.

According to a sixth aspect, an NFC radio frequency communication control apparatus includes:

a communications port, configured to: when receiving a radio frequency communication request sent by a second NFC host, send a first message to a first NFC host; and a processor, configured to: when the communications port receives a second message sent by the first NFC host, terminate a radio frequency communication process currently executed for a third NFC host, where the second message is sent by the first NFC host when determining, after receiving the first message, that the NFCC is currently in a non-idle state and a priority of the second NFC host is higher than a priority of the third NFC host, and the third NFC host is an NFC host corresponding to the radio frequency communication process currently executed by the NFCC.

With reference to the sixth aspect, in a first possible implementation manner, the second message carries configuration info Elation of the second NFC host, and after the communications port receives the second message, the processor further executes a radio frequency communication process for the second NFC host; or after the communications port receives the second message and when the communications port receives a radio frequency communication request resent by the second NFC host, the processor executes a radio frequency communication process for the second NFC host, where after receiving a third message sent by the first NFC host, the second NFC host resends the radio frequency communication request.

With reference to the sixth aspect or the first possible implementation manner of the sixth aspect, in a second possible implementation manner, the sending, by the communications port, a first message to a first NFC host when the communications port receives a radio frequency communication request sent by a second NFC host includes:

sending, by the communications port, a notification message to the first NFC host after the communications port receives the radio frequency communication request sent by the second NFC host and when it is determined that the processor currently executes the radio frequency communication process for the third NFC host; or sending, by the communications port, a notification message to the first NFC host after the communications port receives the radio frequency communication request sent by the second NFC host.

With reference to the second possible implementation manner of the sixth aspect, in a third possible implementation manner, the processor is further configured to:

after the communications port receives the radio frequency communication request sent by the second NFC host, if the processor determines that the processor is currently in an idle state, execute the radio frequency communication process for the second NFC host.

With reference to the second possible implementation manner of the sixth aspect, in a fourth possible implementation manner, the processor is further configured to:

if the communications port sends the notification message to the first NFC host after the communications port receives the radio frequency communication request sent by the second NFC host, after the communications port receives a fourth message sent by the first NFC host, execute the radio frequency communication process for the second NFC host, where the fourth message is sent by the first NFC host when determining that the NFCC is currently in an idle state.

With reference to the sixth aspect, and any one of the foregoing implementation manners of the sixth aspect, in a fifth possible implementation manner, the processor is further configured to:

if the communications port receives a fifth message sent by the first NFC host, reject the execution of the radio frequency communication process for the second NFC host, where the fifth message is sent by the first NFC host when determining that the NFCC is currently in a non-idle state and the priority of the second NFC host is lower than the priority of the third NFC host.

According to a seventh aspect, an NFC radio frequency communication control system includes a first NFC host, a second NFC host, a third NFC host, and a near field communication controller NFCC, where:

the first NFC host is configured to: receive a first message, where the first message indicates that the second NFC host requests radio frequency communication; when determining that the NFCC is currently in a non-idle state, compare a priority of the second NFC host with a priority of the third NFC host; and when the priority of the second NFC host is higher than the priority of the third NFC host, send a second message to the NFCC, where the third NFC host is an NFC host corresponding to a radio frequency communication process currently executed by the NFCC; and the NFCC is configured to terminate, according to the second message, the radio frequency communication process currently executed for the third NFC host.

With reference to the seventh aspect, in a first possible implementation manner, the second message carries configuration information of the second NFC host, and the second message is further used to instruct the NFCC to execute a radio frequency communication process for the second NFC host; or when the priority of the second NFC host is higher than the priority of the third NFC host, the first NFC host is further configured to: send a third message to the second NFC host, to instruct the second NFC host to request radio frequency communication again.

With reference to the seventh aspect or the first possible implementation manner of the seventh aspect, in a second possible implementation manner, the receiving, by the first NFC host, a first message includes: receiving, by the first NFC host, a notification message sent by the NFCC, where the notification message is sent by the NFCC after receiving a radio frequency communication request sent by the second NFC host; or receiving, by the first NFC host, a radio frequency communication request sent by the second NFC host; and the NFCC is further configured to: after receiving the radio frequency communication request sent by the second NFC host and when determining that the NFCC currently executes the radio frequency communication process for the third NFC host, send the notification message to the first NFC host; or after receiving the radio frequency communication request sent by the second NFC host, send the notification message to the first NFC host.

With reference to the second possible implementation manner of the seventh aspect, in a third possible implementation manner, the NFCC is further configured to:

after the NFCC receives the radio frequency communication request sent by the second NFC host, if it is determined that the NFCC is currently in an idle state, execute the radio frequency communication process for the second NFC host.

With reference to the second possible implementation manner of the seventh aspect, in a fourth possible implementation manner, the determining, by the first NFC host, that the NFCC is currently in a non-idle state includes:

if the first NFC host receives the notification message sent by the NFCC, immediately determining, by the first NFC host when receiving the notification message, that the NFCC is currently in a non-idle state; or if the first NFC host receives the notification message sent by the NFCC, determining, by the first NFC host, that the NFCC is currently in a non-idle state after the first NFC host receives the notification message and when the first NFC host learns that the NFCC currently executes the radio frequency communication process for the third NFC host; or if the first NFC host receives the radio frequency communication request sent by the second NFC host, determining, by the first NFC host, that the NFCC is currently in a non-idle state after the first NFC host receives the radio frequency communication request and when the first NFC host learns that the NFCC currently executes the radio frequency communication process for the third NFC host.

With reference to the fourth possible implementation manner of the seventh aspect, in a fifth possible implementation manner, the first NFC host is further configured to:

after the first NFC host receives the notification message sent by the NFCC or receives the radio frequency communication request sent by the second NFC host, if the first NFC host learns that the NFCC is currently in an idle state, send a fourth message to the NFCC, so that the NFCC executes, according to the fourth message, the radio frequency communication process for the second NFC host.

With reference to the seventh aspect, and any one of the foregoing implementation manners of the seventh aspect, in a sixth possible implementation manner, the comparing, by the first NFC host, compare a priority of the second NFC host with a priority of the third NFC host that currently uses the NFCC includes:

comparing, by the first NFC host, the priority of the second NFC host with the priority of the third NFC host according to priority information pre-configured by the first NFC host for NFC hosts; or comparing, by the first NFC host, the priority of the second NFC host with the priority of the third NFC host according to priority information initially configured in a system; or notifying, by the first NFC host, a user of related prompt information of the second NFC host and that of the third NFC host, and comparing the priority of the second NFC host with the priority of the third NFC host, according to priorities that are set by the user based on the related prompt information.

With reference to the seventh aspect, and any one of the foregoing implementation manners of the seventh aspect, in a seventh possible implementation manner, the first NFC host is further configured to:

when the first NFC host determines that the priority of the second NFC host is lower than the priority of the third NFC host, send a fifth message to the NFCC, so that the NFCC rejects, according to the fifth message, the execution of the radio frequency communication process for the second NFC host.

In summary, in the embodiments of the present invention, after receiving a first message used to indicate that a second NFC host requests radio frequency communication and when determining that an NFCC is currently in a non-idle state, a first NFC host compares a priority of the second NFC host with a priority of a third NFC host, where the third NFC host is an NFC host corresponding to a radio frequency communication process currently executed by the NFCC, and when the priority of the second NFC host is higher than the priority of the third NFC host, the first NFC host sends a second message to the NFCC, and the NFCC terminates, according to the second message, the radio frequency communication process currently executed for the third NFC host. In this way, because a corresponding priority is configured for each NFC host, when an NFC host with a high priority runs, a right to use the NFCC can be acquired preferentially, and correspondingly, a radio frequency communication process corresponding to an NFC host with a low priority is terminated, so that the problem that a conflict occurs when multiple NFC hosts request radio frequency communication from an NFCC in an NFC multi-host architecture is effectively avoided, thereby maintaining system running reliability.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
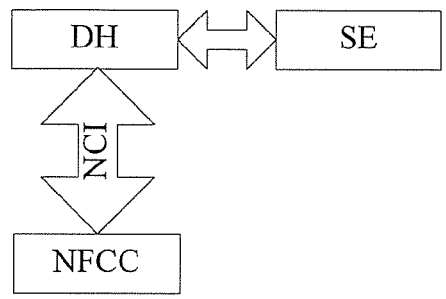
FIG. 1 is a schematic diagram of a single host architecture of an NFC device in the prior art.
Figure 2:
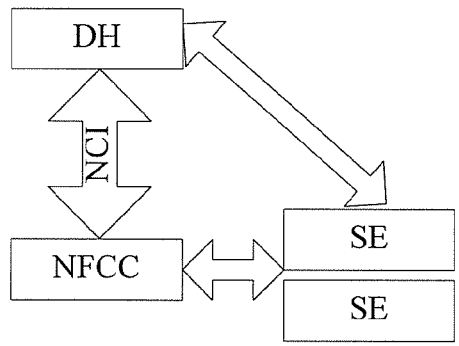
FIG. 2 is a schematic diagram of a multi-host architecture of an NFC device in the prior art.
Figure 3:
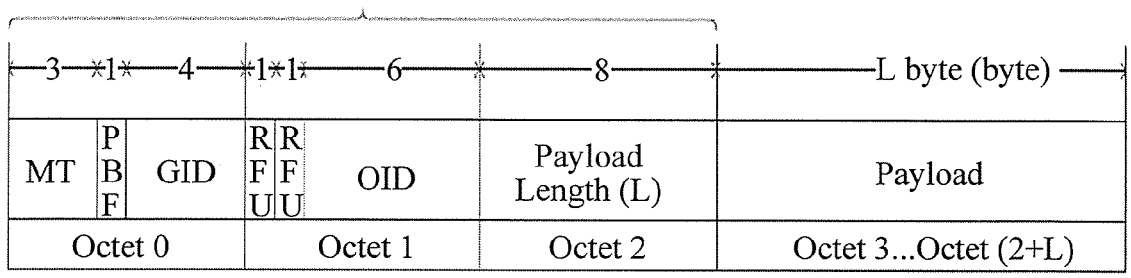
FIG. 3 is a schematic diagram of a message format used in an embodiment of the present invention.

Optionally, a general message format in all the embodiments of the present invention is defined as shown in FIG. 3, where MT: indicates a message type, where 001b represents a control instruction, 010b represents a response message, and 011b represents a notification message;

PBF: 0b indicates that the message is a complete message packet;

GID: indicates a group identifier;

OID: indicates an option identifier;

Payload Length: indicates a payload length;

Payload: indicates data; and

OCTET: indicates one byte, that is, eight bits.

Figure 4:
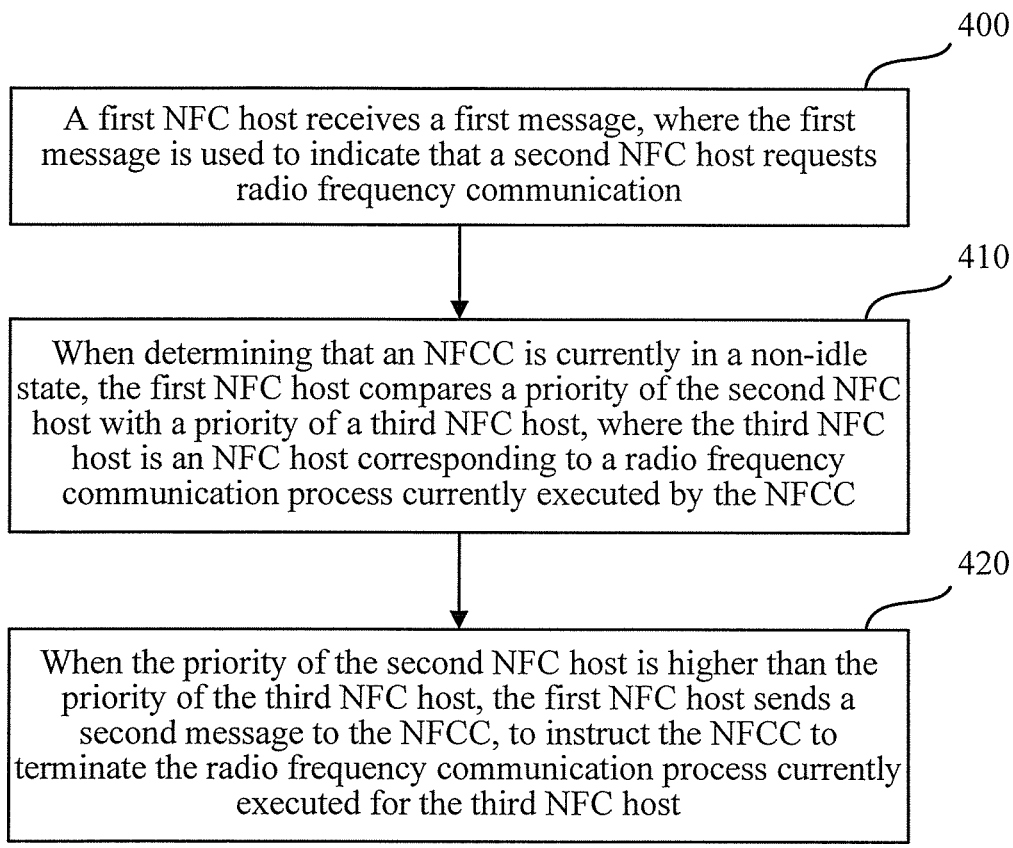
FIG. 4 is a flowchart of a first NFC radio frequency communication control method in an embodiment of the present invention.

Referring to FIG. 4, in an embodiment of the present invention, a first procedure of controlling NFC radio frequency communication is as follows:

Step 400: A first NFC host receives a first message, where the first message is used to indicate that a second NFC host requests radio frequency communication.

In an actual application, optionally, the first NFC host is a DH, and the second NFC host is an SE.

In this embodiment, the first message received by the first NFC host may be a notification message that is sent by an NFCC to the first NFC host when the NFCC receives a radio frequency communication request sent by the second NFC host, or a radio frequency communication request sent by the second NFC host, where the radio frequency communication request may be directly sent by the second NFC host to the first NFC host, or may be sent by the second NFC host to the NFCC and then forwarded by the NFCC to the first NFC host.

Step 410: When determining that the NFCC is currently in a non-idle state, the first NFC host compares a priority of the second NFC host with a priority of a third NFC host, where the third NFC host is an NFC host corresponding to a radio frequency communication process currently executed by the NFCC.

In an actual application, the third NFC host may be another SE.

In this embodiment, when the first NFC host determines whether the NFCC is currently in a non-idle state, the following manners may be used but the present invention is not limited thereto:

Optionally, if the first NFC host receives a notification message sent by the NFCC, the first NFC host immediately determines, when receiving the notification message, that the NFCC is currently in a non-idle state. In this case, the NFCC sends the notification message to the first NFC host when the NFCC has determined that the NFCC is in a non-idle state.

Optionally, if the first NFC host receives a notification message sent by the NFCC, the first NFC host determines that the NFCC is currently in a non-idle state after the first NFC host receives the notification message and when the first NFC host learns that the NFCC currently executes a radio frequency communication process for the third NFC host. In this case, after receiving a radio frequency communication request, the NFCC directly sends the notification message to the first NFC host, and the first NFC host determines, according to a previous case of controlling the NFCC to perform radio frequency communication, whether the NFCC is currently in a non-idle state.

Optionally, if the first NFC host receives a radio frequency communication request sent by the second NFC host, the first NFC host determines that the NFCC is currently in a non-idle state after the first NFC host receives the radio frequency communication request and when the first NFC host learns that the NFCC currently executes a radio frequency communication process for the third NFC host. In this case, after receiving the radio frequency communication request, the NFCC directly sends a notification message to the first NFC host, and the first NFC host determines, according to a previous case of controlling the NFCC to perform radio frequency communication, whether the NFCC is currently in a non-idle state.

It should be noted that the NFCC may have multiple states, such as the following 7 states: 1. an idle state (RFST_IDLE), where when the first NFC host and the NFCC are successfully initialized, a radio frequency communication state of the NFCC is idle; 2. a state of executing radio frequency discovery (RFST_DISCOVERY), where the state is a state in which the NFCC initiates a radio frequency discovery process according to a radio frequency discovery command, and executes the radio frequency discovery process according to discovery configuration (discovery configuration); 3. a state of discovering multiple remote devices (remote NFC endpoints) (RFST_W4_ALL_DISCOVERIES), where the state is a state in which the NFCC discovers one or more remote devices; 4. a state selected by a host (RFST_W4_HOST_SELECT), where the state is a state in which after discovering multiple remote devices, the NFCC waits for an NFC host to select a remote device; 5. a polling state after activation (RFST_POLL_ACTIVE), where the state is a state in which the NFCC is activated and in a polling mode; 6. a listening state after activation (RFST_LISTEN_ACTIVE), where the state is a state in which the NFCC is activated and in a listening mode; and 7. a sleep state (RFST_LISTEN_SLEEP), where when the NFCC is in a listening state after activation, and no content is detected by listening for a long time, the NFCC is switched to the sleep state. A remote NFC endpoint may be an NFC device, or may be an NFC tag.

The radio frequency communication process in the embodiments of the present invention may include: any one or more processes of all processes from when the NFCC initiates the radio frequency discovery process to when the radio frequency communication between the NFCC and the remote device ends, that is, during a radio frequency communication process, the NFCC may be in any state of the foregoing states 2 to 6. In the foregoing seven states, the six states except the idle state may be collectively referred to as a non-idle state.

On the other hand, in this embodiment, when the first NFC host compares the priority of the second NFC host with the priority of the third NFC host, the following manners may also be used but the present invention is not limited thereto:

Optionally, the first NFC host may compare the priority of the second NFC host with the priority of the third NFC host according to priority information pre-configured by the first NFC host for the second NFC host and the third NFC host.

For example, after a system is started, the first NFC host may set an NFC host priority list according to a user instruction, where pre-configured priorities of NFC hosts are recorded in the NFC host priority list. In this way, the priorities of the NFC hosts may be flexibly set according to the user instruction, thereby better meeting user requirements.

Optionally, the first NFC host may also compare the priority of the second NFC host with the priority of the third NFC host according to priority information initially configured in a system.

For example, the first NFC host may determine a priority of each NFC host according to priority information of NFC hosts that is set in a system by default at a pre-delivery stage. In this way, setting time of priority information can be effectively saved, and control efficiency of radio frequency communication can be improved.

Optionally, the first NFC host may further notify a user of prompt information of the second NFC host and that of the third NFC host, and compare the priority of the second NFC host with the priority of the third NFC host according to priorities that are set by the user based on the prompt information.

For example, the first NFC host prompts the user with application content of the second NFC host and that of the third NFC host, and asks the user to select one host from the second NFC host and the third NFC host as an NFC with a high priority. In this way, priorities of the second NFC host and the third NFC host can be set according to temporary user requirements in a more flexible and convenient manner.

Step 420: When the priority of the second NFC host is higher than the priority of the third NFC host, the first NFC host sends a second message to the NFCC, to instruct the NFCC to terminate the radio frequency communication process currently executed for the third NFC host.

In this embodiment, when step 420 is performed, the first NFC host may add configuration information of the second NFC host to the second message. In this case, the second message is further used to instruct the NFCC to execute a radio frequency communication process for the second NFC host.

Alternatively, when step 420 is performed, and when the priority of the second NFC host is higher than the priority of the third NFC host, the first NFC host may further send a third message to the second NFC host, to instruct the second NFC host to request radio frequency communication again. In this case, the NFCC already terminates the execution of the radio frequency communication process for the third NFC host, and therefore, when the second NFC host requests radio frequency communication again, the NFCC can immediately start executing a radio frequency communication process for the second NFC host.

It should be noted that in step 420, the first NFC host instructs the NFCC to terminate the current radio frequency communication process. After the NFCC terminates the current radio frequency communication process, the NFCC may directly execute a radio frequency communication process for the second NFC host, or may execute a radio frequency communication process for the second NFC host when the second NFC host requests radio frequency communication again.

In this embodiment, optionally, the second message used by the first NFC host may use the following newly added RF_DISCOVERY_SE_REQ_CMD, whose message format is shown in Table 1.

TABLE 1

| Payload field | Length | Description |
|---|---|---|
| SE ID | 1 Octet | SE identifier, used to specify an SE for which an NFCC is to initiate a radio frequency communication process |
| RF Protocol | 1 Octet | Radio frequency protocol, used to specify a protocol used to initiate radio frequency communication; see Table 101 in the NCI Specification |
| RF Technology and Mode | 1 Octet | Radio frequency technology and mode, used to specify a radio frequency technology and mode used to initiate radio frequency communication; see Table 103 in the NCI Specification | where MT is 001b; PBF is 0b; GID is 1111b; OID is 0010b; and Payload Length is 3 Octets.

The first NFC host sends RF_DISCOVERY_SE_REQ_CMD to the NFCC, to terminate radio frequency communication that is being performed by the NFCC. Further, the first NFC host may further initiate a radio frequency communication request to the NFCC for an NFC host indicated by configuration information carried in RF_DISCOVERY_SE_REQ_CMD.

Correspondingly, optionally, the NFCC uses the following newly added RF_DISCOVERY_SE_REQ_RSP as a response message of the second message, whose message format is shown in Table 2.

TABLE 2

| Payload field | Length | Description |
|---|---|---|
| Status | 1 Octet | Table 92 in the NCI 1.0 Specification | where MT is 010b; PBF is 0b; GID is 1111b; OID is: 0011b; and PayloadLength is 1 Octet.

In the foregoing embodiment, when step 410 is performed, after the first NFC host receives the notification message sent by the NFCC or receives the radio frequency communication request sent by the second NFC host, if the first NFC host learns that the NFCC is currently in an idle state, the first NFC host sends a fourth message to the NFCC, to instruct the NFCC to execute the radio frequency communication process for the second NFC host.

Further, in this embodiment, optionally, the fourth message used by the first NFC host may use the following newly added RF_DISCOVERY_ALLOW_SE_REQ_CMD, whose message format is shown in Table 3.

TABLE 3

| Payload field | Length | Description |
|---|---|---|
| SE ID | 1 Octet | SE identifier, used to specify an SE for which an NFCC is to initiate radio frequency communication |
| RF Protocol | 1 Octet | Radio frequency protocol, used to specify a protocol used to initiate radio frequency discovery and communication; see Table 101 in the NCI Specification |
| RF Technology and Mode | 1 Octet | Radio frequency technology and mode, used to specify a radio frequency technology and mode used to initiate radio frequency communication; see Table 103 in the NCI Specification | where MT is 001b; PBF is 0b; GID is 1111b; OID is 0000b; and PayloadLength is 3 Octets.

The first NFC host sends RF_DISCOVERY_ALLOW_SE_REQ_CMD to the NFCC, to allow the NFCC to execute a radio frequency communication process for a specified SE.

Correspondingly, optionally, the NFCC uses the following newly added RF_DISCOVERY_ALLOW_SE_REQ_RSP as a response message of the fourth message, whose message format is shown in Table 4.

TABLE 4

| Payload field | Length | Description |
|---|---|---|
| Status | 1 Octet | Table 92 in the NCI 1.0 Specification | where MT is 010b; PBF is 0b; GID is 1111b; OID is 0001b; and PayloadLength is 1 Octets.

On the other hand, when step 420 is performed, if the first NFC host determines that the priority of the second NFC host is lower than the priority of the third NFC host, the first NFC host sends a fifth message to the NFCC, where the fifth message is used to indicate that the radio frequency communication requested by the second NFC host is rejected.

Figure 5:
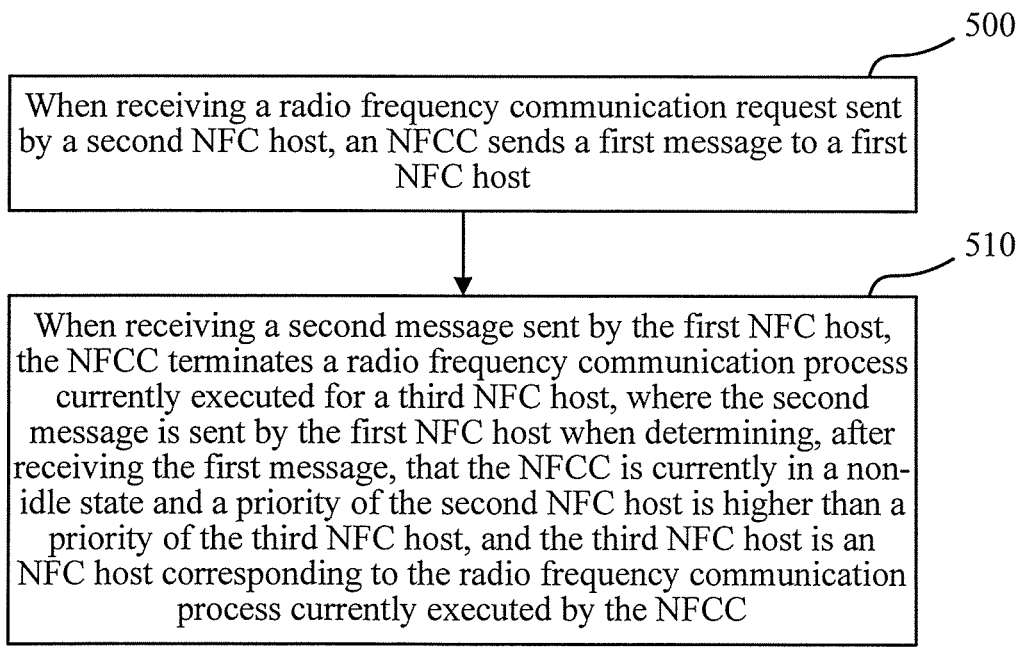
FIG. 5 is a flowchart of a second NFC radio frequency communication control method in an embodiment of the present invention.

Referring to FIG. 5, in an embodiment of the present invention, a second procedure of controlling NFC radio frequency communication is as follows:

Step 500: When receiving a radio frequency communication request sent by a second NFC host, an NFCC sends a first message to a first NFC host.

In this embodiment, when step 500 is performed, the NFCC may send a notification message to the first NFC host after the NFCC receives the radio frequency communication request sent by the second NFC host and when the NFCC determines that the NFCC currently executes a radio frequency communication process for a third NFC host, or the NFCC may immediately send a notification message to the first NFC host after the NFCC receives the radio frequency communication request sent by the second NFC host.

Step 510: When receiving a second message sent by the first NFC host, the NFCC terminates a radio frequency communication process currently executed for the third NFC host, where the second message is sent by the first NFC host when determining, after receiving the first message, that the NFCC is currently in a non-idle state and a priority of the second NFC host is higher than a priority of the third NFC host, and the third NFC host is an NFC host corresponding to the radio frequency communication process currently executed by the NFCC.

In this embodiment, when step 510 is performed, if the second message carries configuration information of the second NFC host, the NFCC may further start executing a radio frequency communication process for the second NFC host after the NFCC receives the second message and when or after the NFCC terminates the radio frequency communication process executed for the third NFC host.

Alternatively, when step 510 is performed, the NFCC may also start a radio frequency communication process for the second NFC host after the NFCC receives the second message and when the NFCC receives a radio frequency communication request resent by the second NFC host, where after receiving a third message sent by the first NFC host, the second NFC host resends the radio frequency communication request.

Optionally, for a message format used by the second message, refer to Table 1, and for a message format of a response message returned by the NFCC, refer to Table 2.

On the other hand, in the foregoing embodiment, if the NFCC receives a fifth message sent by the first NFC host, the NFCC rejects the execution of the radio frequency communication process for the second NFC host, because the fifth message is sent by the first NFC host when determining that the NFCC is currently in a non-idle state and the priority of the second NFC host is lower than the priority of the third NFC host.

In the foregoing embodiment, when step 500 is performed, if the NFCC immediately sends the notification message to the first NFC host after the NFCC receives the radio frequency communication request sent by the second NFC host, the NFCC starts executing the radio frequency communication process for the second NFC host after the NFCC receives a fourth message sent by the first NFC host, where the fourth message is sent by the first NFC host when determining that the NFCC is currently in an idle state.

Optionally, for a message format used by the fourth message, refer to Table 3, and for a message format of a response message returned by the NFCC, refer to Table 4.

On the other hand, when step 500 is performed, after the NFCC receives the radio frequency communication request sent by the second NFC host, if the NFCC determines that the NFCC is currently in an idle state, the NFCC can directly start executing the radio frequency communication process for the second NFC host.

Three specific application scenarios are used below to further introduce the foregoing embodiment in detail.

In all the following application scenarios, that the first NFC host is a DH, a second NFC host is an SE1, and a third NFC host is an SE2 is used as an example for introduction.

Figure 6:
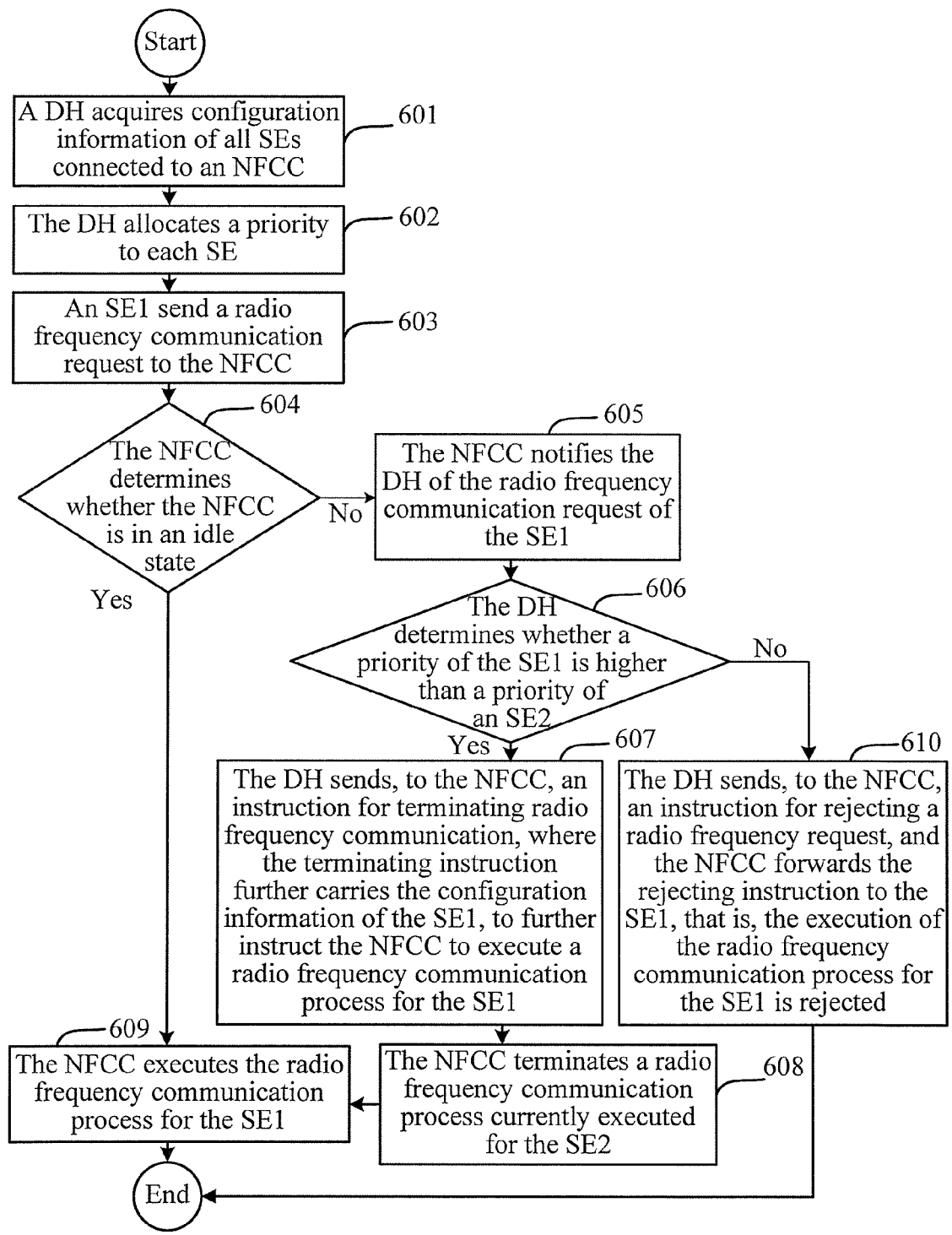
FIG. 6 is a flowchart of an example of a first application scenario in an embodiment of the present invention.

Referring to FIG. 6, a specific implementation procedure of a first application scenario is as follows:

Step 601: A DH acquires configuration information of all SEs connected to an NFCC, where the configuration information at least includes an identifier, a radio frequency protocol, and a radio frequency technology and mode of each SE.

Step 602: The DH allocates a priority to each SE.

Step 602 is an optional operation, because a priority of each SE may be a priority that is set in a system by default, or may be temporarily set by a user during an application according to a specific application scenario, and step 602 is only an example.

Step 603: An SE1 sends a radio frequency communication request to the NFCC.

Step 604: The NFCC determines whether the NFCC is in an idle state, and if the NFCC is in an idle state, step 609 is performed; if the NFCC is in a non-idle state, step 605 is performed.

If the NFCC currently executes a radio frequency communication process for an SE2, the NFCC is in a non-idle state; if the NFCC does not execute any radio frequency communication process, the NFCC is in an idle state.

Step 605: The NFCC notifies the DH of the radio frequency communication request of the SE1, that is, the NFCC sends a notification message to the DH, to notify the DH that the NFCC already receives the radio frequency communication request of the SE1.

Step 606: The DH determines whether a priority of the SE1 is higher than a priority of the SE2, and if the priority of the SE1 is higher than the priority of the SE2, step 607 is performed; if the priority of the SE1 is not higher than the priority of the SE2, step 610 is performed.

Step 607: The DH sends RF_DISCOVERY_SE_REQ_CMD (that is, an instruction for terminating radio frequency communication) to the NFCC, to terminate a radio frequency communication process currently executed by the NFCC for the SE2, where the terminating instruction further carries the configuration information (such as an identifier) of the SE1, to further instruct the NFCC to execute a radio frequency communication process for the SE1.

Step 608: The NFCC terminates the radio frequency communication process currently executed for the SE2, and step 609 is performed.

Step 609: The NFCC executes the radio frequency communication process for the SE1, and the procedure ends.

In this embodiment, the radio frequency communication process executed by the NFCC for the SE1 or the SE2 may include all processes of a radio frequency discovery process, selecting and activating a target device, radio frequency data communication, and ending radio frequency communication.

Step 610: The DH sends, to the NFCC, an instruction for rejecting the radio frequency communication request, the NFCC forwards the rejecting instruction to the SE1, and the execution ends.

Figure 7:
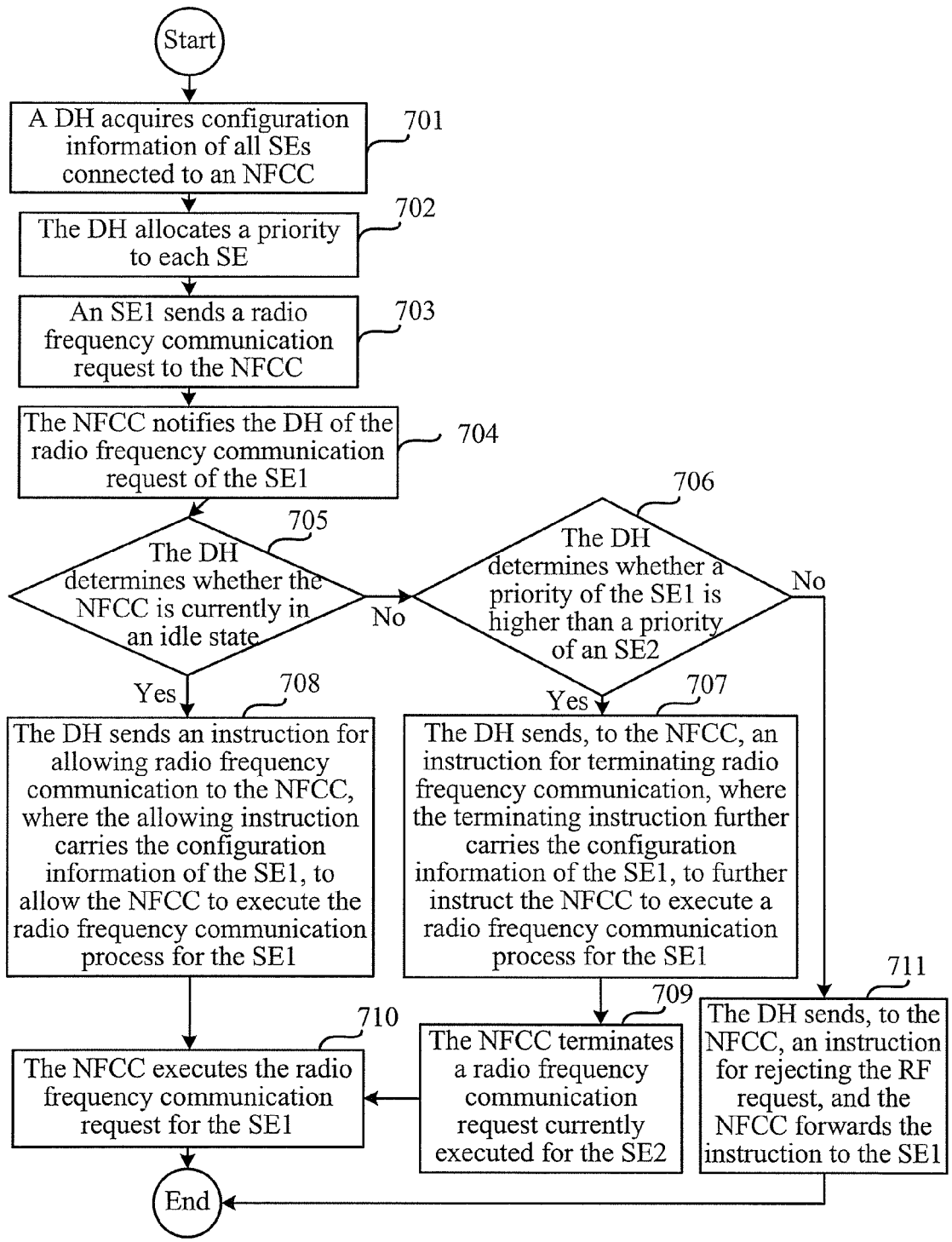
FIG. 7 is a flowchart of an example of a second application scenario in an embodiment of the present invention.

Referring to FIG. 7, a specific implementation procedure of a second application scenario is as follows:

Step 701: A DH acquires configuration information of all SEs connected to an NFCC, where the configuration information at least includes an identifier, a radio frequency protocol, and a radio frequency technology and mode of each SE.

Step 702: The DH allocates a priority to each SE.

Step 702 is an optional operation, because a priority of each SE may be a priority that is set in a system by default, or may be temporarily set by a user during an application according to a specific application scenario, and step 702 is only an example.

Step 703: An SE1 sends a radio frequency communication request to the NFCC.

Step 704: The NFCC notifies the DH of the radio frequency communication request of the SE1, that is, the NFCC sends a notification message to the DH, to notify the DH that the NFCC already receives the radio frequency communication request of the SE1.

Step 705: The DH determines whether the NFCC is currently in an idle state, and if the NFCC is currently in an idle state, step 708 is performed; if the NFCC is currently in a non-idle state, step 706 is performed.

If the NFCC currently executes a radio frequency communication process for an SE2, the NFCC is in a non-idle state; if the NFCC does not execute any radio frequency communication process, the NFCC is in an idle state.

Step 706: The DH determines whether a priority of the SE1 is higher than a priority of the SE2, and if the priority of the SE1 is higher than the priority of the SE2, step 707 is performed; if the priority of the SE1 is not higher than the priority of the SE2, step 711 is performed.

Step 707: The DH sends RF_DISCOVERY_SE_REQ_CMD (that is, an instruction for terminating radio frequency communication) to the NFCC, to terminate a radio frequency communication process currently executed for the SE2, where the terminating instruction further carries the configuration information (such as an identifier) of the SE1, to request radio frequency communication from the NFCC, and then step 709 is performed.

Step 708: The DH sends RF_DISCOVERY_ALLOW_SE_REQ_CMD (that is, an instruction for allowing radio frequency communication) to the NFCC, where the allowing instruction carries the configuration information (such as an identifier) of the SE1, to allow the NFCC to execute the radio frequency communication request for the SE1, and then step 710 is performed.

Step 709: The NFCC terminates the radio frequency communication process currently executed for the SE2, and step 710 is performed.

Step 710: The NFCC executes the radio frequency communication process for the SE1, and the execution ends.

In this embodiment, the radio frequency communication process executed by the NFCC for the SE1 or the SE2 includes all processes of a radio frequency discovery process, selecting and activating a target device, radio frequency data communication, and ending radio frequency communication.

Step 711: The DH sends, to the NFCC, an instruction for rejecting the radio frequency communication request, the NFCC forwards the rejecting instruction to the SE1, and the execution ends.

Figure 8:
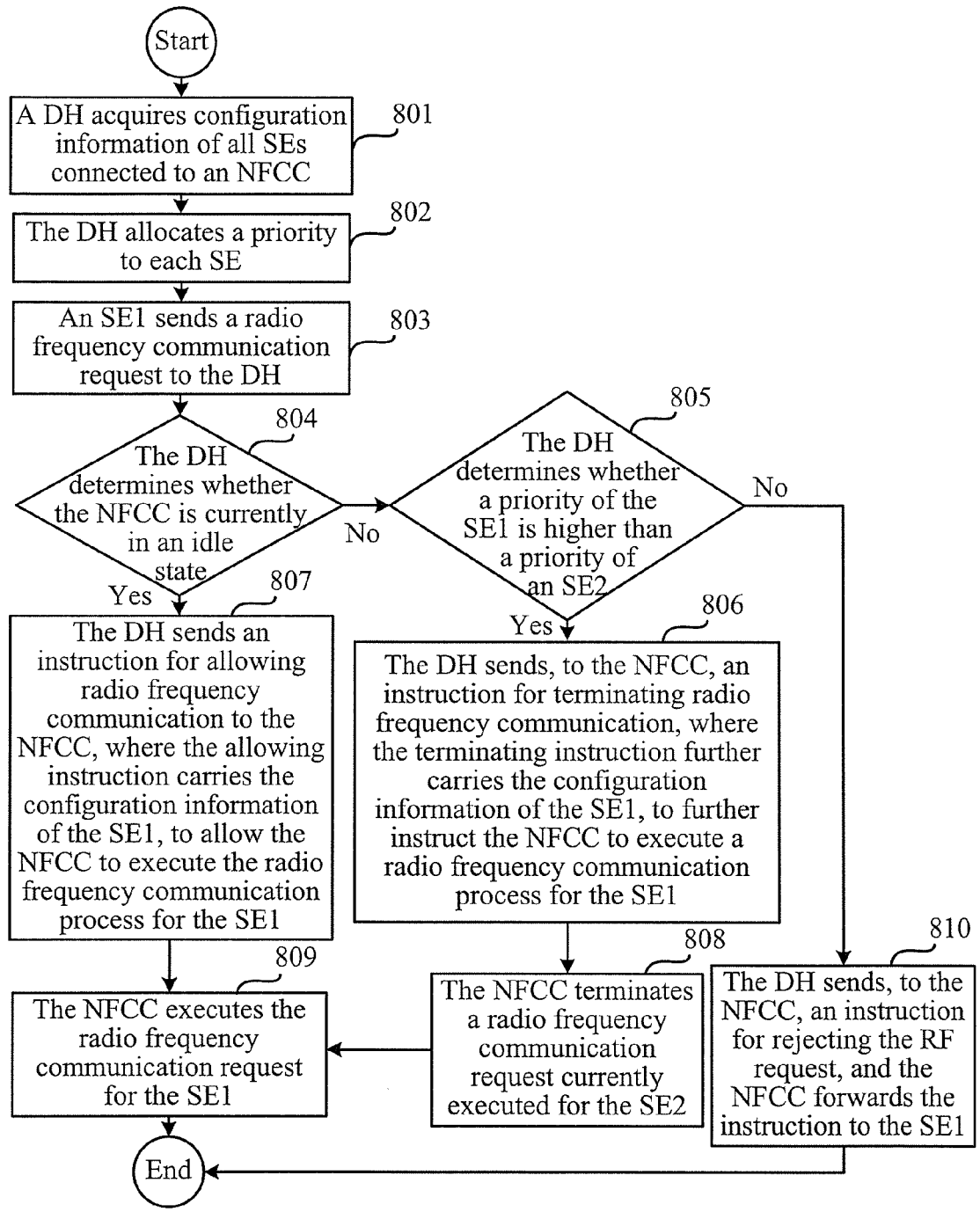
FIG. 8 is a flowchart of an example of a third application scenario in an embodiment of the present invention.

Referring to FIG. 8, a specific implementation procedure of a third application scenario is as follows:

Step 801: A DH acquires configuration information of all SEs connected to an NFCC, where the configuration information at least includes an identifier, a radio frequency protocol, and a radio frequency technology and mode of each SE.

Step 802: The DH allocates a priority to each SE.

Step 802 is an optional operation, because a priority of each SE may be a priority that is set in a system by default, or may be temporarily set by a user during an application according to a specific application scenario, and step 802 is only an example.

Step 803: An SE1 sends a radio frequency communication request to the DH.

Step 804: The DH determines whether the NFCC is currently in an idle state, and if the NFCC is currently in an idle state, step 807 is performed; if the NFCC is currently in a non-idle state, step 805 is performed.

If the NFCC currently executes a radio frequency communication process for an SE2, the NFCC is in a non-idle state; if the NFCC does not execute any radio frequency communication process, the NFCC is in an idle state.

Step 805: The DH determines whether a priority of the SE1 is higher than a priority of the SE2, and if the priority of the SE1 is higher than the priority of the SE2, step 806 is performed; if the priority of the SE1 is not higher than the priority of the SE2, step 810 is performed.

Step 806: The DH sends RF_DISCOVERY_SE_REQ_CMD (that is, an instruction for terminating radio frequency communication) to the NFCC, to terminate a radio frequency communication process currently executed for the SE2, where the terminating instruction further carries the configuration information (such as an identifier) of the SE1, to request radio frequency communication from the NFCC, and then step 808 is performed.

Step 807: The DH sends RF_DISCOVERY_ALLOW_SE_REQ_CMD (that is, an instruction for allowing radio frequency communication) to the NFCC, where the allowing instruction carries the configuration information (such as an identifier) of the SE1, to allow the NFCC to execute the radio frequency communication request for the SE1, and then step 809 is performed.

Step 808: The NFCC terminates the radio frequency communication process currently executed for the SE2, and step 809 is performed.

Step 809: The NFCC executes the radio frequency communication process for the SE1, and the execution ends.

In this embodiment, the radio frequency communication process executed by the NFCC for the SE1 or the SE2 includes all processes of a radio frequency discovery process, selecting and activating a target device, radio frequency data communication, and ending radio frequency communication.

Step 810: The DH sends, to the NFCC, an instruction for rejecting the radio frequency communication request, the NFCC forwards the rejecting instruction to the SE1, and the execution ends.

Figure 9:
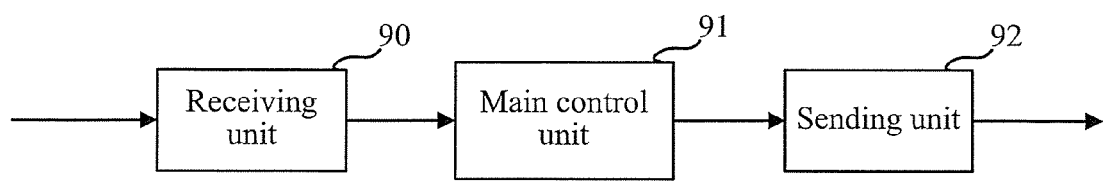
FIG. 9 is a first schematic structural diagram of a first NFC host in an embodiment of the present invention.

Referring to FIG. 9, based on the foregoing embodiments, in an embodiment of the present invention, a first NFC host includes a receiving unit 90, a main control unit 91, and a sending unit 92, where:

the receiving unit 90 is configured to receive a first message, where the first message is used to indicate that a second NFC host requests radio frequency communication;

the main control unit 91 is configured to: when determining that an NFCC is currently in a non-idle state, compare a priority of the second NFC host with a priority of a third NFC host, where the third NFC host is an NFC host corresponding to a radio frequency communication process currently executed by the NFCC; and the sending unit 92 is configured to: when the priority of the second NFC host is higher than the priority of the third NFC host, send a second message to the NFCC, to instruct the NFCC to terminate the radio frequency communication process currently executed for the third NFC host.

The second message carries configuration information of the second NFC host, and the second message is further used to instruct the NFCC to execute a radio frequency communication process for the second NFC host; or when the priority of the second NFC host is higher than the priority of the third NFC host, the sending unit 92 is further configured to: send a third message to the second NFC host, to instruct the second NFC host to request radio frequency communication again.

The receiving, by the receiving unit 90, a first message includes:

receiving, by the receiving unit 90, a notification message sent by the NFCC, where the notification message is sent by the NFCC after receiving a radio frequency communication request sent by the second NFC host; or receiving, by the receiving unit 90, a radio frequency communication request sent by the second NFC host.

The determining, by the main control unit 91, that an NFCC is currently in a non-idle state includes:

if the receiving unit 90 receives the notification message sent by the NFCC, immediately determining, by the main control unit 91, when the receiving unit 90 receives the notification message, that the NFCC is currently in a non-idle state; or if the receiving unit 90 receives the notification message sent by the NFCC, after the receiving unit 90 receives the notification message and when the main control unit 91 learns that the NFCC currently executes the radio frequency communication process for the third NFC host, determining, by the main control unit 91, that the NFCC is currently in a non-idle state; or if the receiving unit 90 receives the radio frequency communication request sent by the second NFC host, after the receiving unit 90 receives the radio frequency communication request and when the main control unit 91 learns that the NFCC currently executes the radio frequency communication process for the third NFC host, determining, by the main control unit 91, that the NFCC is currently in a non-idle state.

The sending unit 92 is further configured to:

after the receiving unit 90 receives the notification message sent by the NFCC or receives the radio frequency communication request sent by the second NFC host, if the main control unit 91 learns that the NFCC is currently in an idle state, send a fourth message to the NFCC, to instruct the NFCC to execute the radio frequency communication process for the second NFC host.

The comparing, by the main control unit 91, a priority of the second NFC host with a priority of a third NFC host includes:

comparing, by the main control unit 91, the priority of the second NFC host with the priority of the third NFC host according to priority information pre-configured by the first NFC host for the second NFC host and the third NFC host; or comparing, by the main control unit 91, the priority of the second NFC host with the priority of the third NFC host according to priority information initially configured in a system; or notifying, by the main control unit 91, a user of prompt information of the second NFC host and that of the third NFC host, and comparing the priority of the second NFC host with the priority of the third NFC host according to priorities that are set by the user based on the prompt information.

The sending unit 92 is further configured to:

when the priority of the second NFC host is lower than the priority of the third NFC host, send a fifth message to the second NFC host, where the fifth message is used to indicate that the radio frequency communication requested by the second NFC host is rejected.

Figure 10:
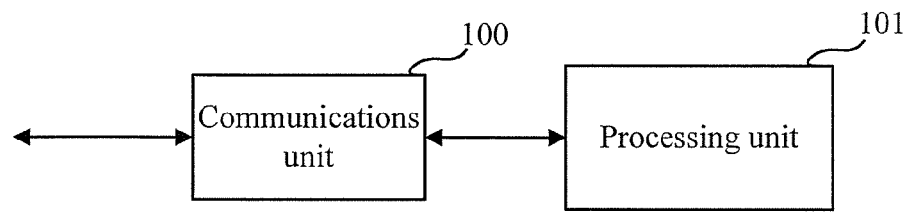
FIG. 10 is a first schematic structural diagram of an NFCC in an embodiment of the present invention.

Referring to FIG. 10, in an embodiment of the present invention, an NFCC includes a communications unit 100 and a processing unit 101, where:

the communications unit 100 is configured to: when receiving a radio frequency communication request sent by a second NFC host, send a first message to a first NFC host; and the processing unit 101 is configured to: when the communications unit 100 receives a second message sent by the first NFC host, terminate a radio frequency communication process currently executed for a third NFC host, where the second message is sent by the first NFC host when determining that the NFCC is currently in a non-idle state and a priority of the second NFC host is higher than a priority of the third NFC host, and the third NFC host is an NFC host corresponding to the radio frequency communication process currently executed by the NFCC.

The second message carries configuration information of the second NFC host, and after the communications unit 100 receives the second message, the processing unit 101 further executes a radio frequency communication process for the second NFC host; or after the communications unit 100 receives the second message and when the communications unit 100 receives a radio frequency communication request resent by the second NFC host, the processing unit 101 executes a radio frequency communication process for the second NFC host, where after receiving a third message sent by the first NFC host, the second NFC host resends the radio frequency communication request.

The sending, by the communications unit 100, a first message to a first NFC host when the communications unit 100 receives a radio frequency communication request sent by a second NFC host includes:

sending, by the communications unit 100, a notification message to the first NFC host after the communications unit 100 receives the radio frequency communication request sent by the second NFC host and when it is determined that the processing unit 101 currently executes the radio frequency communication process for the third NFC host; or immediately sending, by the communications unit 100, a notification message to the first NFC host after the communications unit 100 receives the radio frequency communication request sent by the second NFC host.

The processing unit 101 is further configured to:

after the communications unit 100 receives the radio frequency communication request sent by the second NFC host, if the processing unit 101 determines that the processing unit 101 is currently in an idle state, directly start executing the radio frequency communication process for the second NFC host.

The processing unit 101 is further configured to:

if the communications unit 100 immediately sends the notification message to the first NFC host after the communications unit 100 receives the radio frequency communication request sent by the second NFC host, start executing the radio frequency communication process for the second NFC host after the communications unit 100 receives a fourth message sent by the first NFC host, where the fourth message is sent by the first NFC host when determining that the NFCC is currently in an idle state.

The processing unit 101 is further configured to:

if the communications unit 100 receives a fifth message sent by the first NFC host, reject the execution of the radio frequency communication process for the second NFC host, where the fifth message is sent by the first NFC host when determining that the NFCC is currently in a non-idle state and the priority of the second NFC host is lower than the priority of the third NFC host.

Figure 11:
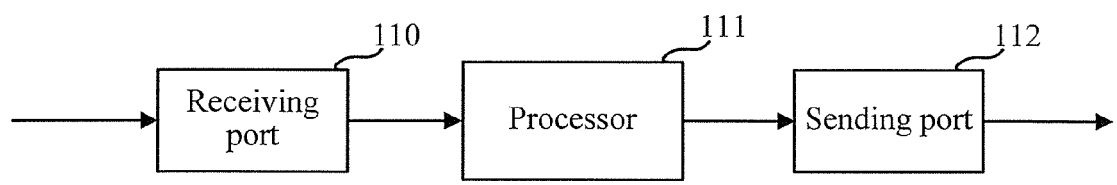
FIG. 11 is a second schematic structural diagram of a first NFC host in an embodiment of the present invention.

Referring to FIG. 11, in an embodiment of the present invention, a first NFC host include a receiving port 110, a processor 111, and a sending port 112, where:

the receiving port 110 is configured to receive a first message, where the first message is used to indicate that a second NFC host requests radio frequency communication;

the processor 111 is configured to: when determining that an NFCC is currently in a non-idle state, compare a priority of the second NFC host with a priority of a third NFC host, where the third NFC host is an NFC host corresponding to a radio frequency communication process currently executed by the NFCC; and the sending port 112 is configured to: when the priority of the second NFC host is higher than the priority of the third NFC host, send a second message to the NFCC, to instruct the NFCC to terminate the radio frequency communication process currently executed for the third NFC host.

The second message carries configuration information of the second NFC host, and the second message is further used to instruct the NFCC to execute a radio frequency communication process for the second NFC host; or when the priority of the second NFC host is higher than the priority of the third NFC host, the sending port 112 is further configured to: send a third message to the second NFC host, to instruct the second NFC host to request radio frequency communication again.

The receiving, by the receiving port 110, a first message includes:

receiving, by the receiving port 110, a notification message sent by the NFCC, where the notification message is sent by the NFCC after receiving a radio frequency communication request sent by the second NFC host; or receiving, by the receiving port 110, a radio frequency communication request sent by the second NFC host.

The determining, by the processor 111, that an NFCC is currently in a non-idle state includes:

if the receiving port 110 receives the notification message sent by the NFCC, immediately determining, by the processor 111 when the receiving port 110 receives the notification message, that the NFCC is currently in a non-idle state; or if the receiving port 110 receives the notification message sent by the NFCC, after the receiving port 110 receives the notification message and when the processor 111 learns that the NFCC currently executes the radio frequency communication process for the third NFC host, determining, by the processor 111, that the NFCC is currently in a non-idle state; or if the receiving port 110 receives the radio frequency communication request sent by the second NFC host, after the receiving port 110 receives the radio frequency communication request and when the processor 111 learns that the NFCC currently executes the radio frequency communication process for the third NFC host, determining, by the processor 111, that the NFCC is currently in a non-idle state.

The sending port 112 is further configured to:

after the receiving port 110 receives the notification message sent by the NFCC or receives the radio frequency communication request sent by the second NFC host, if the processor 111 learns that the NFCC is currently in an idle state, send a fourth message to the NFCC, to instruct the NFCC to execute the radio frequency communication process for the second NFC host.

The comparing, by the processor 111, a priority of the second NFC host with a priority of a third NFC host includes:

comparing, by the processor 111, the priority of the second NFC host with the priority of the third NFC host according to priority information pre-configured by the first NFC host for the second NFC host and the third NFC host; or comparing, by the processor 111, the priority of the second NFC host with the priority of the third NFC host according to priority information initially configured in a system; or notifying, by the processor 111, a user of prompt information of the second NFC host and that of the third NFC host, and comparing the priority of the second NFC host with the priority of the third NFC host according to priorities that are set by the user based on the prompt information.

The sending port 112 is further configured to:

when the priority of the second NFC host is lower than the priority of the third NFC host, send a fifth message to the second NFC host, where the fifth message is used to indicate that the radio frequency communication requested by the second NFC host is rejected.

Figure 12:
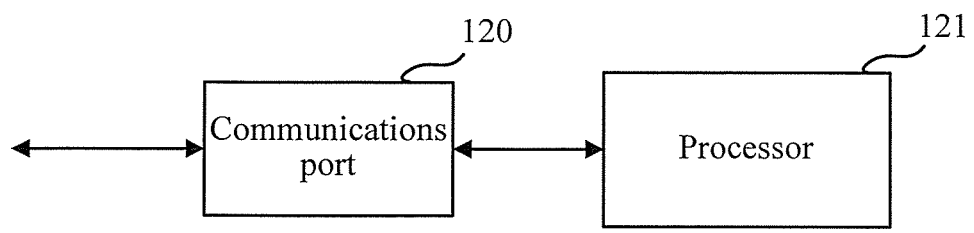
FIG. 12 is a second schematic structural diagram of an NFCC in an embodiment of the present invention.

Referring to FIG. 12, in an embodiment of the present invention, an NFCC includes a communications port 120 and a processor 121, where:

the communications port 120 is configured to: when receiving a radio frequency communication request sent by a second NFC host, send a first message to a first NFC host; and the processor 121 is configured to: when the communications port 120 receives a second message sent by the first NFC host, terminate a radio frequency communication process currently executed for a third NFC host, where the second message is sent by the first NFC host when determining, after receiving the first message, that the NFCC is currently in a non-idle state and a priority of the second NFC host is higher than a priority of the third NFC host, and the third NFC host is an NFC host corresponding to the radio frequency communication process currently executed by the NFCC.

The second message carries configuration information of the second NFC host, and after the communications port 120 receives the second message, the processor 121 further executes a radio frequency communication process for the second NFC host; or after the communications port 120 receives the second message and when the communications port 120 receives a radio frequency communication request resent by the second NFC host, the processor 101 executes a radio frequency communication process for the second NFC host, where after receiving a third message sent by the first NFC host, the second NFC host resends the radio frequency communication request.

The sending, by the communications port 120, a first message to a first NFC host when the communications port 120 receives a radio frequency communication request sent by a second NFC host includes:

sending, by the communications port 120, a notification message to the first NFC host after the communications port 120 receives the radio frequency communication request sent by the second NFC host and when it is determined that the processor 121 currently executes the radio frequency communication process for the third NFC host; or immediately sending, by the communications port 120, a notification message to the first NFC host after the communications port 120 receives the radio frequency communication request sent by the second NFC host.

The processor 121 is further configured to:

after the communications port 120 receives the radio frequency communication request sent by the second NFC host, if the processor 121 determines that the processor 121 is currently in an idle state, directly start executing the radio frequency communication process for the second NFC host.

The processor 121 is further configured to:

if the communications port 120 immediately sends the notification message to the first NFC host after the communications port 120 receives the radio frequency communication request sent by the second NFC host, start executing the radio frequency communication process for the second NFC host after the communications port 100 receives a fourth message sent by the first NFC host, where the fourth message is sent by the first NFC host when determining that the NFCC is currently in an idle state.

The processor 121 is further configured to:

if the communications port 120 receives a fifth message sent by the first NFC host, reject the execution of the radio frequency communication process for the second NFC host, where the fifth message is sent by the first NFC host when determining that the NFCC is currently in a non-idle state and the priority of the second NFC host is lower than the priority of the third NFC host.

Figure 13:
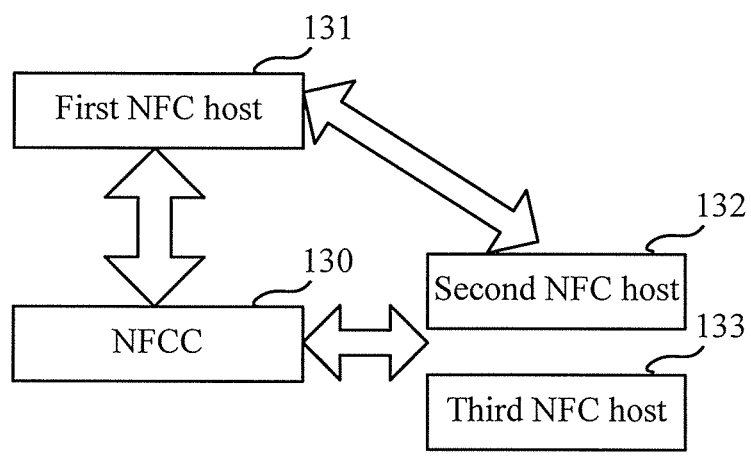
FIG. 13 is a schematic structural diagram of an NFC radio frequency communication control system in an embodiment of the present invention.

Referring to FIG. 13, in an embodiment of the present invention, an NFC radio frequency communication control system includes a first NFC host 131, a second NFC host 132, a third NFC host 133, and an NFCC 130, where:

the first NFC host 131 is configured to: receive a first message, where the first message indicates that the second NFC host 132 requests radio frequency communication; when determining that the NFCC is currently in a non-idle state, compare a priority of the second NFC host 132 with a priority of the third NFC host 133; and when the priority of the second NFC host 132 is higher than the priority of the third NFC host 133, send a second message to the NFCC 130, where the third NFC host 133 is an NFC host corresponding to a radio frequency communication process currently executed by the NFCC 130; and the NFCC 130 is configured to terminate, according to the second message, the radio frequency communication process currently executed for the third NFC host 133.

The second message carries configuration information of the second NFC host 132, and the second message is further used to instruct the NFCC 130 to execute a radio frequency communication process for the second NFC host 132; or when the priority of the second NFC host 132 is higher than the priority of the third NFC host 133, the first NFC host 131 is further configured to: send a third message to the second NFC host 132, to instruct the second NFC host 132 to request radio frequency communication again.

The receiving, by the first NFC host 131, a first message includes:

receiving, by the first NFC host 131, a notification message sent by the NFCC, where the notification message is sent by the NFCC 130 after receiving a radio frequency communication request sent by the second NFC host 132; or receiving, by the first NFC host 131, a radio frequency communication request sent by the second NFC host 132.

The NFCC is further configured to: send a notification message to the first NFC host 131 after the NFCC 130 receives the radio frequency communication request sent by the second NFC host 132 and when it is determined that the NFCC 130 currently executes the radio frequency communication process for the third NFC host 133; or immediately send a notification message to the first NFC host 131 after the NFCC 130 receives the radio frequency communication request sent by the second NFC host 132.

The NFCC 130 is further configured to:

after the NFCC 130 receives the radio frequency communication request sent by the second NFC host, if it is determined that the NFCC 130 is currently in an idle state, directly start executing the radio frequency communication process for the second NFC host.

The determining, by the first NFC host 131, that the NFCC 130 is currently in a non-idle state includes:

if the first NFC host 131 receives the notification message sent by the NFCC, immediately determining, by the first NFC host 131 when receiving the notification message, that the NFCC is currently in a non-idle state; or if the first NFC host 131 receives the notification message sent by the NFCC, determining, by the first NFC host 131, that the NFCC 130 is currently in a non-idle state after the first NFC host 131 receives the notification message and when the first NFC host 131 learns that the NFCC 130 currently executes the radio frequency communication process for the third NFC host 133; or if the first NFC host 131 receives the radio frequency communication request sent by the second NFC host 132, determining, by the first NFC host 131, that the NFCC 130 is currently in a non-idle state after the first NFC host 131 receives the radio frequency communication request and when the first NFC host 131 learns that the NFCC 130 currently executes the radio frequency communication process for the third NFC host 133.

The first NFC host 131 is further configured to:

after the first NFC host 131 receives the notification message sent by the NFCC 130 or receives the radio frequency communication request sent by the second NFC host 132, if the first NFC host 131 learns that the NFCC 130 is currently in an idle state, send a fourth message to the NFCC 130, so that the NFCC 130 start, according to the fourth message, executing the radio frequency communication process for the second NFC host 132.

The comparing, by the first NFC host 131, a priority of the second NFC host 132 with a priority of the third NFC host 133 that currently uses the NFCC 130 includes:

comparing, by the first NFC host 131, the priority of the second NFC host 132 with the priority of the third NFC host 133 according to priority information pre-configured by the first NFC host 131 for NFC hosts; or comparing, by the first NFC host 131, the priority of the second NFC host 132 with the priority of the third NFC host 133 according to priority information initially configured in a system; or notifying, by the first NFC host 131, a user of related prompt information of the second NFC host 132 and that of the third NFC host 133, and comparing the priority of the second NFC host 132 with the priority of the third NFC host 133 according to priorities that are set by the user based on the related prompt information.

The first NFC host 131 is further configured to:

when the first NFC host 131 determines that the priority of the second NFC host 132 is lower than the priority of the third NFC host 133, send a fifth message to the NFCC 130, so that the NFCC 130 rejects, according to the fifth message, the execution of the radio frequency communication process for the second NFC host 132.

In summary, in the embodiments of the present invention, a first NFC host compares a priority of a second NFC host with a priority of a third NFC host after the first NFC host receives a first message used to indicate that a second NFC host requests radio frequency communication and when the first NFC host determines that an NFCC is currently in a non-idle state, where the third NFC host is an NFC host corresponding to a radio frequency communication process currently executed by the NFCC, and when the priority of the second NFC host is higher than the priority of the third NFC host, the first NFC host sends a second message to the NFCC, and the NFCC terminates, according to the second message, the radio frequency communication process currently executed for the third NFC host. In this way, because a corresponding priority is configured for each NFC host, when an NFC host with a high priority runs, a right to use the NFCC can be acquired preferentially, and correspondingly, a radio frequency communication process corresponding to an NFC host with a low priority is terminated, so that the problem that a conflict occurs when multiple NFC hosts request radio frequency communication from an NFCC in an NFC multi-host architecture is effectively avoided, thereby maintaining system running reliability.

Further, in the embodiments of the present invention, an interface is provided for the first NFC host to send a newly defined terminating instruction to the NFCC, so that the NFCC terminates all on-going radio frequency communication processes. In addition, optionally, the terminating instruction carries configuration information of an NFC host with a high priority, so that the NFCC preferentially executes a radio frequency communication process for the NFC host with a high priority, and therefore the NFC host with a high priority can still use the NFCC when the NFCC is not idle, thereby effectively ensuring running reliability of the NFC host with a high priority.

On the other hand, in the embodiments of the present invention, an interface is provided to allow the NFCC to execute or reject a radio frequency communication request of another NFC host, so that the NFC host with a high priority can still use the NFCC when the NFCC is not idle, thereby further effectively ensuring running liability of the NFC host with a high priority.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the other programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A near field communication (NFC) radio frequency communication control method, comprising:
   receiving, by a first NFC host, a first message used to indicate that a second NFC host requests radio frequency communication;
   when the first NFC host determines a near field communication controller (NFCC) is currently in a non-idle state, comparing, by the first NFC host, a priority of the second NFC host with a priority of a third NFC host, wherein the third NFC host is an NFC host corresponding to a radio frequency communication process currently executed by the NFCC; and
   when the priority of the second NFC host is higher than the priority of the third NFC host, sending, by the first NFC host, a second message to the NFCC, to instruct the NFCC to terminate the radio frequency communication process currently executed for the third NFC host.

2. The method according to claim 1, wherein:
   the second message carries configuration information of the second NFC host, and the second message is further used to instruct the NFCC to execute a radio frequency communication process for the second NFC host; or when the priority of the second NFC host is higher than the priority of the third NFC host, sending, by the first NFC host, a third message to the second NFC host, to instruct the second NFC host to request radio frequency communication again.

3. The method according to claim 1, wherein receiving the first message comprises:

receiving, by the first NFC host, a notification message sent by the NFCC, wherein the notification message is sent by the NFCC after receiving a radio frequency communication request sent by the second NFC host; or receiving, by the first NFC host, a radio frequency communication request sent by the second NFC host.

4. The method according to claim 3, wherein determining that the NFCC is currently in a non-idle state comprises:

when the first NFC host receives the notification message sent by the NFCC, determining, by the first NFC host while receiving the notification message, that the NFCC is currently in a non-idle state; or when the first NFC host receives the notification message sent by the NFCC, determining, by the first NFC host, that the NFCC is currently in a non-idle state after the first NFC host receives the notification message and when the first NFC host learns that the NFCC currently executes the radio frequency communication process for the third NFC host; or when the first NFC host receives the radio frequency communication request sent by the second NFC host, determining, by the first NFC host, that the NFCC is currently in a non-idle state after the first NFC host receives the radio frequency communication request and when the first NFC host learns that the NFCC currently executes the radio frequency communication process for the third NFC host.

5. The method according to claim 4, further comprising:

after the first NFC host receives the notification message sent by the NFCC or receives the radio frequency communication request sent by the second NFC host, when the first NFC host learns that the NFCC is currently in an idle state, sending, by the first NFC host, a fourth message to the NFCC, to instruct the NFCC to execute the radio frequency communication process for the second NFC host.

6. The method according to claim 1, wherein comparing the priority of the second NFC host with the priority of the third NFC host comprises:

comparing, by the first NFC host, the priority of the second NFC host with the priority of the third NFC host according to priority information pre-configured by the first NFC host for the second NFC host and the third NFC host; or comparing, by the first NFC host, the priority of the second NFC host with the priority of the third NFC host according to priority information initially configured in a system; or notifying, by the first NFC host, a user of prompt information of the second NFC host and that of the third NFC host, and comparing the priority of the second NFC host with the priority of the third NFC host according to priorities that are set by the user based on the prompt information.

7. The method according to claim 1, further comprising:

when the priority of the second NFC host is lower than the priority of the third NFC host, sending, by the first NFC host, a fifth message to the second NFC host, wherein the fifth message is used to indicate that the radio frequency communication requested by the second NFC host is rejected.

8. A near field communication (NFC) radio frequency communication control method, comprising:

sending, by a near field communication controller (NFCC), a first message to a first NFC host when the NFCC receives a radio frequency communication request sent by a second NFC host; and terminating, by the NFCC, a radio frequency communication process currently executed for a third NFC host when the NFCC receives a second message sent by the first NFC host, wherein the second message is sent by the first NFC host when determining, after receiving the first message, that the NFCC is currently in a non-idle state and a priority of the second NFC host is higher than a priority of the third NFC host, and the third NFC host is an NFC host corresponding to the radio frequency communication process currently executed by the NFCC.

9. The method according to claim 8, further comprising:

further executing, by the NFCC, a radio frequency communication process for the second NFC host after the NFCC receives the second message, wherein the second message carries configuration information of the second NFC host; or executing, by the NFCC, a radio frequency communication process for the second NFC host after the NFCC receives the second message and when the NFCC receives a radio frequency communication request resent by the second NFC host, wherein after receiving a third message sent by the first NFC host, the second NFC host resends the radio frequency communication request.

10. The method according to claim 8, wherein sending the first message to the first NFC host when the NFCC receives the radio frequency communication request sent by the second NFC host comprises:

sending, by the NFCC, a notification message to the first NFC host after the NFCC receives the radio frequency communication request sent by the second NFC host and when the NFCC determines that the NFCC currently executes the radio frequency communication process for the third NFC host; or sending, by the NFCC, a notification message to the first NFC host after the NFCC receives the radio frequency communication request sent by the second NFC host.

11. The method according to claim 10, further comprising:

after the NFCC receives the radio frequency communication request sent by the second NFC host, when it is determined that the NFCC is currently in an idle state, executing, by the NFCC, the radio frequency communication process for the second NFC host.

12. The method according to claim 10, further comprising:

when the NFCC sends the notification message to the first NFC host after the NFCC receives the radio frequency communication request sent by the second NFC host, executing, by the NFCC, the radio frequency communication process for the second NFC host after the NFCC receives a fourth message sent by the first NFC host, wherein the fourth message is sent by the first NFC host when determining that the NFCC is currently in an idle state.

13. The method according to claim 8, further comprising:
when the NFCC receives a fifth message sent by the first NFC host, rejecting, by the NFCC, the execution of the radio frequency communication process for the second NFC host, wherein the fifth message is sent by the first NFC host when determining that the NFCC is currently in a non-idle state and the priority of the second NFC host is lower than the priority of the third NFC host.

14. A near field communication (NFC) radio frequency communication control system, comprising:
a first NFC host;
a second NFC host;
a third NFC host; and
a near field communication controller (NFCC);
wherein:
the first NFC host is configured to:
receive a first message, wherein the first message indicates that the second NFC host requests radio frequency communication,
when determining that the NFCC is currently in a non-idle state, compare a priority of the second NFC host with a priority of the third NFC host, and
when the priority of the second NFC host is higher than the priority of the third NFC host, send a second message to the NFCC, wherein the third NFC host is an NFC host corresponding to a radio frequency communication process currently executed by the NFCC; and
the NFCC is configured to terminate, according to the second message, the radio frequency communication process currently executed for the third NFC host.

15. The system according to claim 14, wherein:
the second message carries configuration information of the second NFC host, and the second message is further used to instruct the NFCC to execute a radio frequency communication process for the second NFC host; or
when the priority of the second NFC host is higher than the priority of the third NFC host, the first NFC host is further configured to:
send a third message to the second NFC host, to instruct the second NFC host to request radio frequency communication again.

16. The system according to claim 14, wherein:
receiving, by the first NFC host, the first message comprises:
receiving, by the first NFC host, a notification message sent by the NFCC, wherein the notification message is sent by the NFCC after receiving a radio frequency communication request sent by the second NFC host; or receiving, by the first NFC host, a radio frequency communication request sent by the second NFC host; and
the NFCC is further configured to:
after receiving the radio frequency communication request sent by the second NFC host and when determining that the NFCC currently executes the radio frequency communication process for the third NFC host, send the notification message to the first NFC host; or
after receiving the radio frequency communication request sent by the second NFC host, send the notification message to the first NFC host.

17. The system according to claim 16, wherein the NFCC is further configured to:
after the NFCC receives the radio frequency communication request sent by the second NFC host, when it is determined that the NFCC is currently in an idle state, execute the radio frequency communication process for the second NFC host.

18. The system according to claim 16, wherein determining that the NFCC is currently in a non-idle state comprises:
when the first NFC host receives the notification message sent by the NFCC, determining, by the first NFC host while receiving the notification message, that the NFCC is currently in a non-idle state; or
when the first NFC host receives the notification message sent by the NFCC, determining, by the first NFC host, that the NFCC is currently in a non-idle state after the first NFC host receives the notification message and when the first NFC host learns that the NFCC currently executes the radio frequency communication process for the third NFC host; or
when the first NFC host receives the radio frequency communication request sent by the second NFC host, determining, by the first NFC host, that the NFCC is currently in a non-idle state after the first NFC host receives the radio frequency communication request and when the first NFC host learns that the NFCC currently executes the radio frequency communication process for the third NFC host.

19. The system according to claim 18, wherein the first NFC host is further configured to:
after the first NFC host receives the notification message sent by the NFCC or receives the radio frequency communication request sent by the second NFC host, when the first NFC host learns that the NFCC is currently in an idle state, send a fourth message to the NFCC, so that the NFCC executes, according to the fourth message, the radio frequency communication process for the second NFC host.

20. The system according to claim 14, wherein comparing the priority of the second NFC host with the priority of the third NFC host comprises:
comparing, by the first NFC host, the priority of the second NFC host with the priority of the third NFC host according to priority information pre-configured by the first NFC host for NFC hosts; or
comparing, by the first NFC host, the priority of the second NFC host with the priority of the third NFC host according to priority information initially configured in a system; or
notifying, by the first NFC host, a user of prompt information of the second NFC host and that of the third NFC host, and comparing the priority of the second NFC host with the priority of the third NFC host, according to priorities that are set by the user based on the related prompt information.

21. The system according to claim 14, wherein the first NFC host is further configured to:
when the first NFC host determines that the priority of the second NFC host is lower than the priority of the third NFC host, send a fifth message to the NFCC, so that the NFCC rejects, according to the fifth message, the execution of the radio frequency communication process for the second NFC host.

* * * * *